United States Patent
Planz

[11] 3,893,500
[45] July 8, 1975

[54] TIRE CHAIN CADDY

[76] Inventor: Vernon L. Planz, 469 Shady Ln., Big Bear Lake, Calif. 92315

[22] Filed: Aug. 30, 1974

[21] Appl. No.: 502,051

[52] U.S. Cl.............. 152/213 R; 81/15.8; 254/88
[51] Int. Cl. .......................................... B60c 27/00
[58] Field of Search........... 152/208, 213 R, 213 A, 152/221–238; 254/88; 81/15.8

[56] References Cited
UNITED STATES PATENTS
2,022,804   12/1935   Garey ........................... 254/88
FOREIGN PATENTS OR APPLICATIONS
457,758   6/1949   Canada ........................ 152/213 R Primary Examiner—Robert B. Reeves
Assistant Examiner—Larry H. Martin
Attorney, Agent, or Firm—Jack C. Munro

[57] ABSTRACT

An apparatus for holding a tire chain for a vehicle wheel which facilitates the storage of the chain when not in use and also facilitates the location of the chain upon the tire. Once the chain is placed within the apparatus of this invention, the chain cannot be accidentally removed therefrom and is always in position to be readily placed over a vehicle wheel. A structure of this invention includes inclined ramp members mounted upon a base and a pair of main members upon which the vehicle wheel is to rest during placement of the tire chain upon the wheel. An incline ramp member is located adjacent each main member with therebeing a space or pocket therebetween. A lock is connected with each incline ramp and functions to close off the pocket and prevent removal of any cross links of chain contained therein.

9 Claims, 4 Drawing Figures

PATENTED JUL 8 1975  3,893,500

TIRE CHAIN CADDY

BACKGROUND OF THE INVENTION

The field of this invention relates to vehicles and more particularly to a device which is adapted to retain the snow and ice chain when such is not in use and also facilitates location of the chain upon the vehicle wheel.

When a vehicle is traveling on snow and ice it is normally desirable that the wheels of the vehicle include chains. The chains will dig into the snow and ice and thereby give better traction than without the use of said chains.

An undesirable features of chains is that on dry road they are not needed and actually are a hindrance to travel. Therefore, the chains are usually carried in the trunk of the vehicle and are installed when the vehicle coming into contact with snow and ice. Once the vehicle has left the snow and ice, the chains are then removed.

The normal procedure is for the chains to be merely carried in a pile within the trunk or the vehicle. The chains easily become entangled and once entangled are quite difficult to untangle. The weather conditions are undesirable at the time of installation as it is usually cold and damp. Also, the chains themselves are cold and damp and if it takes a substantial period of time to entangle the chains, the person's hands become quite stiff and it further makes it difficult to untangle the chains.

To merely place the chain by itself upon the wheels of the vehicle, it is an extremely cold and wet procedure and it normally take several minutes to place a single chain upon a single wheel.

Previously, there have been devices, particularly ramp type of devices, which can be employed to facilitate the location of a chain upon a wheel. These ramp type of devices make no provision for storage of the chain and therefore the chain must be untangled and placed upon the device prior to location of the chain upon the wheel. It would be desirable to design some form of a ramp device which also functioned as a storage device for the chain when not in use.

SUMMARY OF THE INVENTION

The structure of this invention is believed to be basically described within the Abstract Of The Disclosure and reference is to be had thereto.

The primary objective of the structure of this invention is to facilitate the location of a chain upon a vehicle wheel. The structure of this invention also serves as a storage device for the chain when not in use. The structure of this invention eliminates the use of jacks or any other kind of hoisting mechanism in order to place the chain upon the tire. The structure of this invention positions the vehicle wheel over the chain while allowing necessary freedom of movement of the chain for installation. The structure of this invention maintains the position of the chain in such a manner as to allow easy chain hook-up from behind and below the fender skirt of the vehicle. When not in use, the chain is locked into the structure and absolutely prevents entanglement of the chain.

DETAILED DESCRIPTION OF THE SHOWN EMBODIMENT

Figure 1:
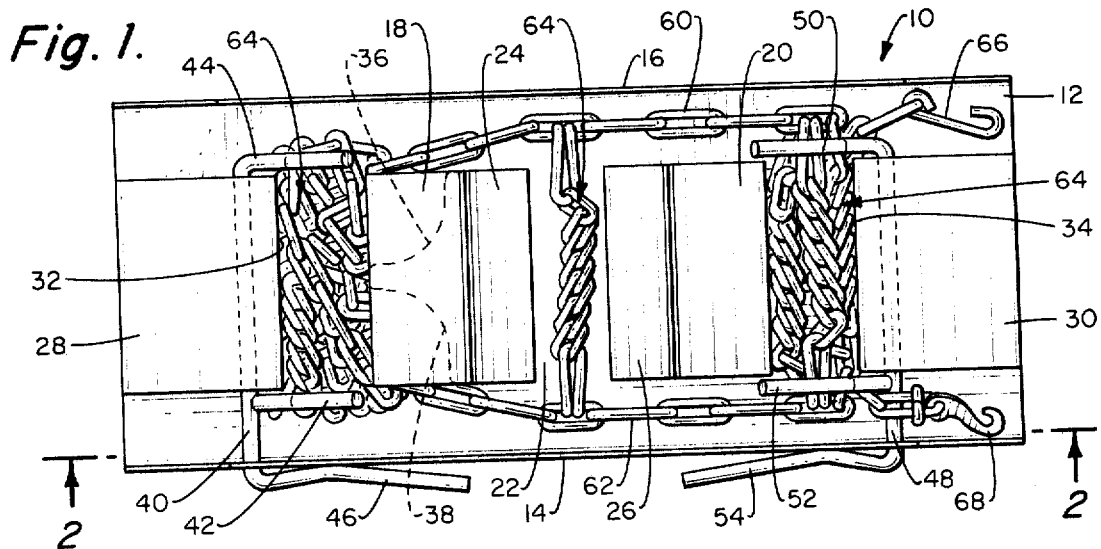
FIG. 1 is a plan view of the tire chain caddy of this invention.
Figure 2:
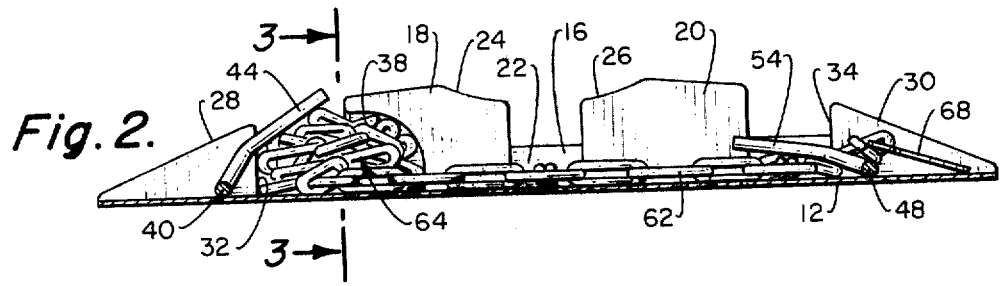
FIG. 2 is cross-sectional side view of the tire chain caddy of this invention taken along line 2—2 of FIG. 1.
Figure 3:
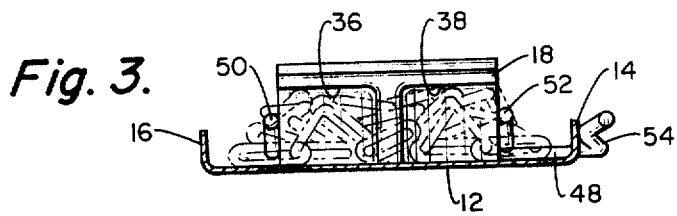
FIG. 3 is a cross-sectional view taken along line 3—3 of FIG. 2.

Referring particularly to the drawing, there is shown in FIG. 1 the tire chain caddy 10 of this invention which is composed basically of a planar sheet metal base 12 which has upstanding, lateral edges 14 and 16. Attached to the base 12, on the upper surface thereof, is a first main member 18 and a second main member 20. The width of the main members 18 and 20 is less than the width of the base 12 so that on the lateral side of the main members 18 and 20 are formed passageways, the function of which will be explained further on in the specification. The members 18 and 20 are located substantially adjacent the longitudinal center of the base 12 but are spaced apart a predetermined distance in order to form a pocket 22.

The upper surface of the main member 18 is formed to include a dished-out section 24. In a similar manner, the upper surface of the main member 20 includes a dished-out section 26. The dished-out sections 24 and 26 are to cooperate to facilitate location of a vehicle wheel 29 thereon.

Attached to the base 12 at either longitudinal end thereof are inclined members 28 and 30. It is to be understood that the members 28 and 30, as well as members 18 and 20 are formed of a rigid material such as metal and is integrally secured as by welding to the base 12. Although metal is found to be the preferable material construction for the device of this invention, it is to be understood that the device of this invention could be made of other rigid materials, such as an extremely rigid plastic which would be capable of supporting the weight of the vehicle.

The width of the inclined members 28 and 30 is shown to be substantially equal to the width of the members 18 and 20. The inclined member 28 is spaced a predetermined distance from the member 18 so as to form a pocket 32. In a similar manner, the incline member 30 is spaced from member 20 so as to form a pocket 34. The spacing between the members 28 and 18 is substantially identical to the spacing between members 30 and 20, however this is not a necessary requirement. The spacing is predetermined so that a vehicle wheel may be driven upward over either inclined member 28 and 30, up over its respective main member 18 or 20 and come to rest within the dished-out sections 24 and 26.

In order to enlarge the pocket 32, the main member 18 has been cut-out to form cut-out sections 36 and 38. The function of these cut-out sections will be explained further on in the specification.

A locking bar 40 is pivotally mounted within the inclined member 28 and extends entirely therethrough. The locking bar 40 includes right angled locking members 42 and 44 which are sufficient length to be located directly adjacent the main member 18 and thereby extend across pocket 32. A handle 46 is connected to the rod 40. The handle 46 is to be movable into frictional contact with the edge 14 and when such is in frictional contact, the locking rod sections 42 and 44 overlie the pocket 32.

Figure 4:
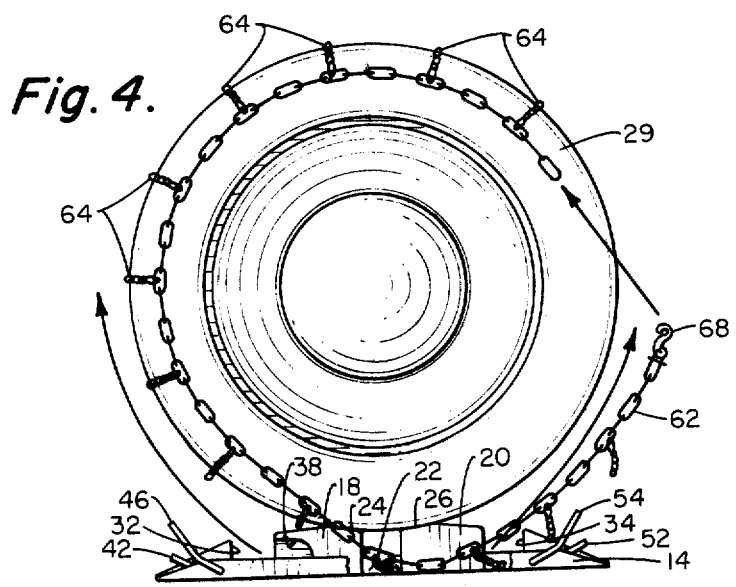
FIG. 4 is a side view showing the tire chain caddy of this invention with a vehicle wheel mounted thereon and the procedure for locating the chain about the vehicle wheel.

In a similar manner, a locking rod 48 is provided which extends through the inclined member 30. The rod 48 includes right angled locking rods sections 50 and 52 the length of which is to extend substantially adjacent the main member 20 and to extend across pocket 34. The locking rod 40 also includes a handle 54. The handle 54 is to engage at the side 14 as does handle 46. The function of the handles 54 and 46 is to facilitate pivotal movement of the respective locking rods 48 and 40 to either overlie their respective pocket 34 or 32 or to be displaced therefrom as shown in FIG. 4.

The operation of the tire chain caddy is as follows: A conventional tire chain which has side links of chain 60 and 62 are interconnected by a plurality of spaced apart cross links 64. The side links 60 includes a hook 66 at one end thereof. The hook 66 is to connect with the open link of the chain which is located at the other end of the side chain 60, when the chain is placed about the tire 28. The side chain 60 is to be placed on the inside of the tire.

The side chain 62 includes a latching hook 68. The latching hook 68 is to connect with the ending link of its side chain 62 when it is placed about the tire 29. This side chain 62 is to be located on the outside of the tire 29 in order to facilitate the access to the latching of the latching link 68.

The first three cross links 64 that are located nearest the hook 66 and the latching hook 68, are to be located within the pocket 34. The next succeeding cross link 64 is to be placed within the pocket 22. The remaining cross links 64 are to be placed within the pocket 32. The side chains 60 and 62 are located within the side passageways formed on either side of the base 12. During the time the chain is in the storage position, the locking bar 48 is pivoted so that the handle 54 is in frictional contact with the side 14. In this position, the right angle sections 50 and 52 extend across the pocket 34 and prevent removal of of the three links 64 located within that pocket.

In a similar manner, the locking bar 40 is pivoted so that the handle 46 engages the side 14 which causes the sections 44 and 42 to extend across the pocket 32 and prevent removal of the cross links 64 contained therein. The frictional contact of the handles 46 and 54 is such that if the device is turned over or even moved about roughly, that the corss links 64 cannot be discharged from their appropriate compartment. There is no need to physically confine the cross link 64 contained within the compartment 22 as the cross links on either side of that particular cross link are restrained in opposite pockets.

Because of the large number of cross links 64 that are contained within the pocket 32, it is for this reason that the sections 36 and 38 are formed so as to provide additional room within the pocket 32 in order to hold the additional number of cross links. With the chain so stowed away within the device 10 of this invention, the device 10 could be readily thrown into the trunk of a vehicle or handled in a quite rough manner and yet the chain will not become dislodged from the device.

It is to be understood that there will normally be two in number of the devices 10, one for each chain that is to be applied to the rear wheel of a vehicle. If it is desirable to put chains on all four wheels of the vehicle, there will be four in number of the devices 10.

When it is desired to mount the chain upon the tire 29, the device is removed from its stowed position and placed either forward of the tire 29 or aft of the tire 29. The vehicle is then moved appropriately so that the tire 29 will move up either the ramp 28 or 30 and upon the main members 18 and 20 and rest within the dished-out sections 24 and 26 as shown in FIG. 4 of the drawing. The operator then moves both of the locking rods 40 and 48 by movement of the handles 46 and 54 effecting opening of the pockets 32 and 34. This movement of the locking rods 40 and 48 may be accomplished prior to moving of the tire 29 upon the main members 18 and 20.

Once the tire 29 is located on the main members 18 and 20, the operator grasps the quantity of chain located within pocket 32 and moves the chain around the tire, this length of chain extending approximately two hundred and forty degrees around the tire. The operator then grasps the chain located within the pocket 34 and extends such to connect with the other end of the chain. The operator then connects hook 66 and then connects latching hook 68. The operator can then drive the vehicle off the device 10 and replace the device 10 within the storage compartment within the trunk of the vehicle and the chains are completely installed.

When it is desirous to remove the chain from the wheel 29, once it is removed, it is replaced within the device 10 and the rods 48 and 40 are moved to the latching position so as to retain the chain in connection with the device 10.

What is claimed is:
1. A tire chain caddy comprising:
   a base;
   a pair of spaced apart main members attached to said base;
   a pair of inclined members attached to said base with a said inclined member located adjacent each longitudinal end of said base, a pocket located between each said inclined member and its adjacent main member, side passageways formed upon said base on either side of said main members; and
   locking means for closing each of said pockets thereby preventing removal of links of chain contained within said pockets.
2. The tire chain caddy as defined in claim 1 wherein: said base being substantially planar and having upstanding edges located on the lateral side of said base, said locking means frictionally engaging at least one of said upstanding edges when said locking means is located in the locking position.
3. The tire chain caddy as defined in claim 1 wherein: one of said main members including a cut-out section whereby one of said pockets is larger than the other of said pockets.
4. The tire chain caddy as defined in claim 1 wherein: said locking means comprising a pair of locking rods with one of each said locking rods located adjacent a said pocket, each said locking rod being pivotally secured with respect to said base.
5. The tire chain caddy as defined in claim 4 wherein: each of said locking rods being pivotally mounted within a said inclined member.
6. In combination with a vehicle tire chain having a pair of side chains interconnected with a plurality of spaced cross chains, a tire chain caddy comprising:

a base having an upper surface and a lower surface;

a first upstanding member attached to said upper surface and located adjacent the longitudinal center of said base;

a second upstanding member attached to said upper surface and located adjacent the longitudinal center of said base, said second member being spaced a predetermined distance from said first member so a vehicle wheel may rest on both said members, a single said cross chain to be locatable between said members, the width of said first and second members being less than the width of said base forming a side passageway on either side of said members within which a single said side chain is to be located;

a first ramp attached to said upper surface, said ramp having a forward edge and a back edge, said forward edge located directly adjacent said upper surface, the height of said back edge being almost equal to the height of said first upstanding member, said back edge located adjacent said first member but spaced therefrom forming the first pocket, said first pocket to contain a plurality of said cross links;

a second ramp attached to said upper surface, said second ramp having a second forward edge and a second back edge, said second forward edge located directly adjacent said upper surface, the height of said second back edge being almost equal to the height of said second upstanding member, said second back edge located adjacent said second member but spaced therefrom forming a second pocket; first lock means located between said first member and said first ramp, said first lock means being movable between a locked position and an unlocked position, said locked position to prevent removal of said cross links contained within said first pockets; and second lock means located between said second member and said second ramp, said second lock means being movable between a locked position and an unlocked position, said locked position to prevent removal of said cross links contained within said second pocket.

7. A tire chain caddy as defined in claim 6 wherein:
said base being substantially planar and has upstanding edges located on each lateral side of said base, said first and said second lock means frictionally engaging one of said upstanding edges when said first and second lock means are in the locked position.

8. A tire chain caddy as defined in claim 6 wherein:
said first upstanding member including a cut-out section whereby said first pocket is larger than said second pocket.

9. A tire chain caddy as defined in claim 6 wherein:
said first lock means being pivotally mounted within said first ramp, said second lock means being pivotally mounted within said second ramp.

* * * * *